United States Patent Office 2,770,656
Patented Nov. 13, 1956

2,770,656

PREPARATION OF ETHYLENE GLYCOL

David J. Pye, Concord, Calif., assignor to The Dow Chemical Company, Midland, Mich., a corporation of Delaware No Drawing. Application June 5, 1953,
Serial No. 359,960

13 Claims. (Cl. 260—635)

This invention relates to the catalytic vapor phase hydration of alkylene oxides to alkylene glycols. More particularly, the present invention relates to the catalytic vapor phase hydration of ethylene oxide to ethylene glycol.

Several processes are known for the liquid phase hydration of ethylene oxide to ethylene glycol in weakly acidic solutions. These processes at best give a product solution containing only about 17 percent ethylene glycol contaminated with a considerable proportion of polyglycols. In attempting to produce more highly concentrated product solutions of ethylene glycol, more polyglycols are produced instead of ethylene glycol. Extensive purification is therefore inevitable in these acid-catalyzed liquid phase processes, since the recovery of ethylene glycol from the total product solution is complicated by the presence of catalyzing acid, polyglycol impurities, and large volumes of water. Recently, Cartmell et al. accomplished the hydration of ethylene oxide in the vapor phase over a solid catalyst of $Ag_2O$ on alumina, cf. Ind. Eng. Chem. 40, 389–392 (1948). By employing a solid $Ag_2O$ catalyst in the vapor phase, Cartmell et al. were able to avoid catalyst contamination of the product glycol but exceedingly poor conversions and yields to ethylene glycol were obtained.

It is therefore an object of this invention to provide an improved process for the preparation of ethylene glycol. A related object is to provide an improved vapor phase process whereby ethylene glycol can be prepared in good conversions and yields by the catalytic vapor phase hydration of ethylene oxide. Another object is to provide an improved process for hydrating ethylene oxide to ethylene glycol containing little if any higher molecular weight glycols or other impurities. A still further object is to provide a process for hydrating ethylene oxide to a product glycol solution from which high purity ethylene glycol can be easily and economically separated.

The process of the present invention broadly comprises passing a vapor phase mixture of water and ethylene oxide over a catalyst comprising a normal calcium phosphate at a reaction temperature below 500° C. Ordinarily the reactant mixture of steam and ethylene oxide is passed through a reaction zone of the hot calcium phosphate catalyst at a rate such as to be retained therein for a time sufficiently long to achieve the desired degree of reaction. The reactant gas stream is then condensed, or partially condensed, to obtain a strong aqueous ethylene glycol solution, generally of greater than 33 percent concentration, containing very little if any polyglycols. Under optimum conditions, greater than 90 percent of the ethylene oxide charged may be converted to ethylene glycol with yields of greater than 90 percent.

The catalyst employed in the instant process consists essentially of a normal calcium phosphate composed of calcium combined with phosphate radicals. Tricalcium phosphate, $Ca_3(PO_4)_2$, is a good catalyst per se. An even more effective catalyst is tricalcium phosphate promoted with a small amount of copper, e. g. as copper phosphate, and sometimes containing in addition thereto, a minor proportion of calcium acid phosphate, viz. $CaHPO_4$. Such a catalyst is broadly referred to as calcium copper phosphate in the following description. Although a mechanical mixture of the preformed normal ortho-phosphates of calcium and copper may be used to catalyze the hydration of ethylene oxide in the vapor phase, the preferred calcium copper phosphate catalyst is similar to, and may well be, a solid body of phosphate radicals chemically combined with calcium and copper in a regular and definite spacial relationship to one another, e. g. so that some of the phosphate radicals are combined with both calcium and copper. An exceptionally good catalyst for the present process is calcium copper phosphate consisting of a mixture of $Ca_3(PO_4)_2$ and $CaHPO_4$ in a mole ratio of $CaO$ to $P_2O_5$ of 2.7 to 2.8 and containing from 0.1 to 1.0 percent by weight of copper in combined form, such as a salt of copper, e. g. copper phosphate.

A calcium copper phosphate catalyst for use in the process of the invention may be prepared by grinding together an aqueous mixture of tricalcium phosphate and a minor amount of copper phosphate, and thereafter drying, or extruding and drying, the resultant mixture. Usually, however, the calcium copper phosphate catalyst is prepared by precipitation, under neutral or alkaline conditions, by admixing an aqueous solution of soluble calcium and copper salts with a water-soluble ortho-phosphate, e. g. ortho-phosphoric acid, or an ammonium or an alkali metal phosphate. After being formed under neutral or alkaline conditions, the catalyst is generally washed with water and dried. Prior to use, it may be admixed in powdered or granular form with a lubricant, such as graphite, and pressed into tablets of a convenient size. Thereafter, any lubricant is removed by oxidation and the resultant catalyst may be employed per se in the process of the invention.

Both tricalcium phosphate and calcium copper phosphate catalysts are very effective for the vapor phase hydration of ethylene oxide to ethylene glycol in the process of the invention. In some instances, however, shorter contact times and lower reactant ratios of water to ethylene oxide may be employed over calcium copper phosphate catalyst to give as good or better results than over tricalcium phosphate. More specifically, a catalyst of calcium copper phosphate appears to be slightly more effective than tricalcium phosphate in the instant process, particularly when the reaction is carried out at conditions which are below optimum.

Either a stationary or fluidized bed of catalyst may be employed in catalyzing the vapor phase hydration of ethylene oxide. In general, better heat transfer, more uniform bed temperatures, and somewhat improved results can be obtained at lower water to ethylene oxide ratios with a fluidized bed of catalyst.

Theoretically one mole of water is required to hydrate one mole of ethylene oxide according to the following equation:

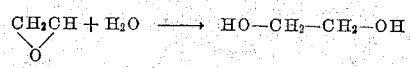

Actually, however, greater than equimolecular proportions of water to ethylene oxide are required for good results. Although a conversion of approximately 90 percent can sometimes be obtained when employing a reactant ratio of water to ethylene oxide of only 2, reactant ratios of greater than 6 are usually required to achieve comparably high yields. The effect of reactant ratios on the results obtained is illustrated in the examples. As therein shown, a reactant ratio of about 6.5 is probably very close to optimum in a fluidized bed of catalyst since at this ratio, maximum conversions and yields are obtained with a minimum of product dilution. In a stationary catalyst bed, however, it has usually been necessary to use somewhat higher reactant ratios than with a fluidized bed of catalyst. Best results in a stationary bed reactor are ordinarily obtained at reactant ratios of at least 17 moles of water per mole of ethylene oxide. Reactant ratios up to 50 or even higher may be employed although such high ratios appear only to dilute unnecessarily the product ethylene glycol solution. In reacting steam and ethylene oxide in a ratio of at least 17 to 1 over a stationary bed of calcium copper phosphate catalyst, yields (based on ethylene oxide consumed) ranging from 84 to 93 percent were obtained as compared to yields of 68 to 84 percent at lower reactant ratios. These lower yields may be due in part to local overheating caused by hot spots resulting from poor heat transfer in stationary bed reactors.

As hereinbefore stated, reaction temperatures in the range of about 200° C. to about 400° C. may be employed in the process of the invention. As the reaction temperature falls below 200° C., the rate at which ethylene oxide is hydrated to ethylene glycol decreases rapidly while at reaction temperatures above 400° C., poor yields of ethylene glycol are obtained. The temperature spread in catalyst beds is influenced by many factors and usually varies over a considerably wider range in stationary beds of catalyst than in fluidized beds. This is particularly true in the instant process and some of the variables which tend to give rise to wide temperature gradients are small reactant ratios of water to ethylene oxide, low entrance temperatures of the reactant gases, and long contact times. In stationary bed reactors, average bed temperatures of from about 220° to 250° C. have usually been observed to give good results when carrying out the process under conditions which closely approach optimum. In fluidized catalyst beds, on the other hand, higher temperatures in the range of from 250° to 350° C. may be employed. Good conversions and yields are generally obtained with fluidized catalysts at reaction temperatures of from 275° C. to about 325° C. In conclusion, it might be stated that in a fluidized catalyst bed, the temperature of the hydration reaction can generally be controlled more easily within narrower limits to give better results at otherwise comparable conditions than in a stationary bed of catalyst.

A contact time, e. g. residence time in the reactor, in the range of from 6 to 15 seconds is generally preferred in the vapor phase hydration of ethylene oxide according to the process of the invention. However, shorter or longer times may be used, e. g. from 1 to 25 seconds or more.

Usually atmospheric or slightly greater than atmospheric pressures are both convenient and satisfactory in the instant porcess although almost any pressure at which the reactants can be maintained in the vapor phase may be employed.

The following examples describe a number of ways which the principle of the invention has been employed and illustrates certain of its advantages, but are not to be construed as limiting the scope of the invention. Conversion and yield values expressed in the examples are defined below:

$$\text{Percent conversion} = \frac{\text{moles of ethylene oxide consumed}}{\text{moles of ethylene oxide charged}} \times 100$$

$$\text{Percent yield based on ethylene oxide consumed} = \frac{\text{moles of ethylene glycol obtained}}{\text{moles of ethylene oxide consumed}} \times 100$$

$$\text{Percent yield based on ethylene oxide charged} = \frac{\text{moles of ethylene glycol obtained}}{\text{moles of ethylene oxide charged}} \times 100$$

Except for the last example in which tricalcium phosphate, $Ca_3(PO_4)_2$, was employed as catalyst, calcium copper phosphate catalyst prepared according to the following general procedure was used:

Over a period of one hour, a solution of 2.96 moles (650 grams) of high purity $CaCl_2 \cdot 6H_2O$ and 0.0124 mole (2.13 grams) of $CuCl_2 \cdot 2H_2O$ dissolved in 12.5 liters of water was gradually added under conditions of good mixing to a solution of 2.052 moles of orthophosphoric acid and 7.02 moles of $NH_4OH$ in 35 liters of water. A fine precipitate of calcium copper phosphate formed while mixing the two solutions and separated therefrom upon standing. Most of the clear reaction liquor was separated from the precipitate by decantation and the remainder was removed by filtration. The precipitate was then mixed with water and refiltered. This process was repeated until essentially all of the chloride had been removed from the precipitate. The washed precipitate was dried for 2 days at 70° C. and for 24 hours at 130° C. The dry material, consisting of approximately 99.5 percent tricalcium phosphate and 0.5 percent coper phosphate, was then ground and screened to size.

*Example 1*

To illustrate the effect of reactant ratio on product results, the following three experiments were carried out over a fluidized calcium copper phosphate catalyst prepared as described above. Steam and ethylene oxide at approximately atmospheric pressure and in the mole ratios listed in the accompanying table were passed into the bottom of an externally heated reactor of about 2 inches in diameter and containing 620 cc. of calcium copper phosphate catalyst having a particle size of 80 to 150 mesh, U. S. Sieve Series. The rate of flow of steam and ethylene oxide was sufficiently large to fluidize the catalyst and was approximately the same for all three runs. The effluent gas stream passed out of the top of the reactor and was cooled to condense steam and the organic reaction product. As will be seen from run 1A of the table, when steam and ethylene oxide were passed in a mole ratio of 6.4 over the fluidized catalyst at a contact time of 9.4 seconds and at an average temperature of 295° C., approximately 91.3 mole percent of the ethylene oxide charged was converted to ethylene glycol with a yield of 99.3 mole percent based on the ethylene oxide consumed. It is apparent that practically no polyglycols are present in run 1A, viz. less than 1 percent.

| Run No. | Reactant Ratio, $H_2O/E.O.$ | Temperature, ° C. | Contact Time, Sec. | Conversion, Mole Percent | Yield Based on Ethylene Oxide Consumed, Mole Percent | Yield Based on Ethylene Oxide Charged, Mole Percent |
|---|---|---|---|---|---|---|
| 1A | 6.4 | 295 | 9.4 | 91.3 | 99.3 | 90.8 |
| 1B | 4.0 | 299 | 10.2 | 93.1 | 88.3 | 82.1 |
| 1C | 2.0 | 295 | 10.3 | 90.3 | 56.2 | 50.7 |

*Example 2*

The following runs conducted according to the general procedure of Example 1 demonstrate that good conversions and yields are obtained when contact times in the range of about 7 to 14 seconds are employed in the catalytic vapor phase hydration of ethylene oxide to ethylene glycol over a fluidized bed of calcium copper phosphate catalyst in the temperature range of 275° to 300° C. As seen in the accompanying table, run 2A was carried out under very similar conditions to run 1A of Example 1 except for contact time. From a comparison of these runs, it is apparent that the mole percent conversion, although very good for each run, was slightly higher in run 2A in which a longer contact time was employed. In run 2B, both contact time and temperature were decreased. To increase the flows of the reactants to obtain shorter contact times, it was necessary to employ a more coarsely ground calcium copper phosphate catalyst, e. g. one having a particle size of 50 to 150 mesh, U. S. Sieve Series. This catalyst had approximately the same composition as the catalyst used in the preceding example. Despite changes in temperature and contact time, the tabulated results show that within the range of conditions investi-

| Run No. | Reactant Ratio, $H_2O/E.O.$ | Temperature, °C. | Contact Time, Sec. | Conversion, Mole Percent | Yield Based on Ethylene Oxide Consumed, Mole Percent | Yield Based on Ethylene Oxide Charged, Mole Percent |
|---|---|---|---|---|---|---|
| 2A | 6.8 | 299 | 14.0 | 94.3 | 97.0 | 91.4 |
| 2B | 6.5 | 275 | 6.8 | 91.3 | 97.8 | 90.0 |

*Example 3*

The hydration of ethylene oxide was carried out over a stationary bed of calcium copper phosphate catalyst similar in composition to that employed in the previous examples. The several runs of this example were carried out at widely different mole ratios of steam to ethylene oxide, average temperatures in the range of about 225° to 250° C., and contact times in the range of about 4 to 6 seconds. These runs over a stationary bed of catalyst are characterized by higher reactant ratios, shorter contact times, and lower average temperatures than those employed with the fluidized catalysts of the previous examples. It was also observed during these runs that rather wide temperature gradients existed throughout the stationary catalyst bed. This is particularly evident for run 3A in which a reactant ratio of 16 moles of water per mole of ethylene oxide was used. The data for all these runs may be found in the table below. Approximately 1000 cc. of calcium copper phosphate catalyst was employed throughout, the particle size of which was 8 to 10 mesh, U. S. Sieve Series.

| Run No. | Reactant Ratio, $H_2O/E.O.$ | Temperature, °C. | | Contact Time, Sec. | Conversion, Mole Percent | Yield Based on Ethylene Oxide Consumed, Mole Percent | Yield Based on Ethylene Oxide Charged, Mole Percent |
|---|---|---|---|---|---|---|---|
| | | Av. | Max. | | | | |
| 3A | 16.0 | 248 | 300 | 6.4 | 95.7 | 84.8 | 81.3 |
| 3B | 25.9 | 227 | 257 | 4.4 | 93.4 | 90.7 | 84.6 |
| 3C | 50.3 | 231 | 252 | 3.7 | 97.2 | 91.4 | 88.9 | gated, these changes had very little effect on the course of the reaction.

*Example 4*

To study the effect of the temperature on the vapor phase hydration of ethylene oxide over a stationary bed of calcium copper phosphate catalyst, two runs were carried out in a similar manner over the same catalyst employed in Example 3 but at higher and at lower average temperatures than the preceding example. A slightly greater conversion but lower yield values were obtained in run 4A at an average temperature of 265° C. than in the 3A run of the preceding example at an average temperature of 248° C. In run 4B carried out at an average temperature of 204° C., however, both conversion and yield values were considerably lower than those of run 3B of Example 3 in which the average temperature was approximately 227° C. The data for these runs are contained in the following table.

| Run No. | Reactant Ratio, $H_2O/E.O.$ | Temperature, °C. | | Contact Time, Sec. | Conversion, Mole Percent | Yield Based on Ethylene Oxide Consumed, Mole Percent | Yield Based on Ethylene Oxide Charged, Mole Percent |
|---|---|---|---|---|---|---|---|
| | | Av. | Max. | | | | |
| 4A | 17.2 | 265 | 312 | 5.8 | 98.0 | 82.3 | 80.7 |
| 4B | 27.6 | 204 | 228 | 4.3 | 87.7 | 66.4 | 58.1 |

*Example 5*

Several runs were carried out over a stationary bed of tricalcium phosphate to illustrate its effectiveness as a catalyst for the vapor phase hydration of ethylene oxide to ethylene glycol at various reactant ratios, contact times, and temperatures. These runs were carried out in a similar manner to the two preceding examples. Approximately 800 cc. of tricalcium phosphate having a particle size of 8 to 10 mesh (U. S. Sieve Series) was employed throughout. The results are given in the table which follows:

| Run No. | Reactant Ratio, $H_2O/E.O.$ | Temperature, °C. | | Contact time, Sec. | Conversion, Mole Percent | Yield Based on Ethylene Oxide Consumed, Mole Percent | Yield Based on Ethylene Oxide Charged, Mole Percent |
|---|---|---|---|---|---|---|---|
| | | Av. | Max. | | | | |
| 5A | 10.4 | 240 | 307 | 14.5 | 97.8 | 78.9 | 77.2 |
| 5B | 18.7 | 258 | 306 | 4.3 | 98.2 | 83.9 | 82.3 |
| 5C | 21.7 | 234 | 287 | 4.0 | 96.8 | 88.4 | 85.7 |
| 5D | 38.4 | 225 | 241 | 4.3 | 91.6 | 89.2 | 80.4 |

What is claimed is:

1. A catalytic vapor phase process for hydrating ethylene oxide to ethylene glycol which comprises passing a vapor phase mixture of water and less than an equimolecular proportion of ethylene oxide over a catalyst comprising a normal calcium ortho phosphate at a reaction temperature below 500° C.

2. A process according to claim 1 wherein a reaction temperature in the range of about 200° C. to about 400° C. is employed.

3. A catalytic vapor process for hydrating ethylene oxide to ethylene glycol which comprises passing a vapor phase mixture of greater than about 6 molecular proportions of water per molecular proportion of ethylene oxide through a bed of a catalyst substantially composed of a normal calcium ortho phosphate at a reaction temperature in the range of about 200° C. to about 400° C.

4. A process according to claim 3 wherein the molecular proportion of water to ethylene oxide is greater than about 17 to 1.

5. A process according to claim 3 wherein the catalyst consists preponderantly of tricalcium phosphate.

6. A process according to claim 5 wherein the catalyst is promoted with copper phosphate.

7. A process according to claim 6 wherein the catalyst is a mixture of $Ca_3(PO_4)_2$ and $CaHPO_4$ in a mole ratio of CaO to $P_2O_5$ of about 2.7 to 2.8 and contains from 0.1 to about 1.0 percent by weight of copper phosphate.

8. A catalytic vapor phase process for hydrating ethylene oxide to ethylene glycol which comprises passing a vapor phase mixture of greater than about 6 molecular proportions of water per molecular proportion of ethylene oxide through a fluid bed of a catalyst composed for the most part of a normal calcium ortho phosphate material at a reaction temperature in the range of about 250° C. to about 350° C. and at a contact time of from about 1 to 25 seconds.

9. A process according to claim 8 wherein the catalyst consists preponderantly of tricalcium phosphate.

10. A process according to claim 9 wherein the catalyst is promoted with copper phosphate.

11. A process according to claim 10 wherein the catalyst is a mixture of $Ca_3(PO_4)_2$ and $CaHPO_4$ in a mole ratio of CaO to $P_2O_5$ of about 2.7 to 2.8 and contains from 0.1 to about 1.0 percent by weight of copper phosphate.

12. A process according to claim 11 wherein the temperature is in the range of 275° to 325° C.

13. A catalytic vapor phase process for hydrating ethylene oxide to ethylene glycol which comprises passing a vapor phase mixture of water and less than an equimolecular proportion of ethylene oxide at a reaction temperature in the range of about 200° C. to about 400° C. over a catalyst comprising a normal metal ortho phosphate composed of a preponderance of calcium and a lesser amount of copper chemically combined with phosphate radicals.

References Cited in the file of this patent

UNITED STATES PATENTS 2,271,942 Keunecke et al. _____ Feb. 3, 1942
2,367,877 Layng _____ Jan. 23, 1945

OTHER REFERENCES

Cartmell et al.: Industrial & Engineering Chemistry, vol. 40, pages 389 to 392 March (1948).